US008548618B1

(12) United States Patent
Story, Jr. et al.

(10) Patent No.: US 8,548,618 B1
(45) Date of Patent: Oct. 1, 2013

(54) SYSTEMS AND METHODS FOR CREATING NARRATION AUDIO

(75) Inventors: Guy A. Story, Jr., New York, NY (US); Steven Hatch, West Orange, NJ (US)

(73) Assignee: Audible, Inc., Newark, NJ (US)

( * ) Notice: Subject to any disclaimer, the term of this patent is extended or adjusted under 35 U.S.C. 154(b) by 327 days.

(21) Appl. No.: 12/880,947

(22) Filed: Sep. 13, 2010

(51) Int. Cl.
*G06F 17/00* (2006.01)

(52) U.S. Cl.
USPC .............................................. 700/94

(58) Field of Classification Search
USPC .................... 700/94; 704/258, 260, 500–504
See application file for complete search history.

(56) References Cited

U.S. PATENT DOCUMENTS

| | | | |
|---|---|---|---|
| 7,231,351 B1 | 6/2007 | Griggs | |
| 2002/0184189 A1* | 12/2002 | Hay et al. | 707/1 |
| 2007/0088712 A1* | 4/2007 | Watson et al. | 707/10 |
| 2008/0140652 A1* | 6/2008 | Millman et al. | 707/6 |
| 2010/0324902 A1* | 12/2010 | Kurzweil et al. | 704/260 |

OTHER PUBLICATIONS

"Autonomy's iVoice Technology is Shipped to First Customers", Autonomy Press Release, Feb. 7, 2001, 2 pages.
"Dragon NaturallySpeaking 10 AudioMining SDK", Nuance, available at least as early as Apr. 22, 2010, 2 pages.
Tantor Media, "Tantor launches audiobook production solution", Stamfordplus.com, Mar. 23, 2011, Available at: http://www.stamfordplus.com/stm/information/nwsl/publish/Business_21/Tantor-launches-audiobook-production-solution12336.shtml.
Kuzyk, Raya, "Tantor Media: The Elephant in the Room", Library Journal, Apr. 1, 2009, 5 pages. Available at: http://www.libraryjournal.com/lj/reviews/audio/854559-287/tantor_media_the_elephant_in.html.csp.

* cited by examiner

*Primary Examiner* — Andrew C Flanders
(74) *Attorney, Agent, or Firm* — Knobbe Martens Olson & Bear LLP

(57) ABSTRACT

Systems and methods are provided for processing narration audio data. In some embodiments, a portion of transcript text comprising words to be narrated by a user may be displayed. Initial narration audio data comprising words of the displayed transcript text may be received. In some embodiments, an indication of a portion of the transcript text to be re-recorded may be received. Replacement narration audio data corresponding to the portion of the transcript text to be re-recorded may be received, and the replacement narration audio data may be incorporated into the initial narration audio data.

30 Claims, 6 Drawing Sheets

SYSTEMS AND METHODS FOR CREATING NARRATION AUDIO

BACKGROUND

Publishers and/or authors frequently offer audio versions of their books or other written works to consumers. Audio books and other narration audio recordings, such as spoken word recordings of magazine or newspaper articles, are often created in a sound studio by a narrator working in cooperation with a sound engineer and/or other technical specialists. Professional sound recording software is often used to record the narration audio. Such software may be rather complex or require specialized knowledge that the typical voice actor or narrator does not possess. For example, re-recording a portion of previously recorded narration audio may require navigating raw audio data to determine the appropriate portion of audio to replace, and/or require the assistance of a sound engineer who has marked sections of the recording. Accordingly, creating narration audio can often be a time-consuming process that includes parties other than the narrator himself.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
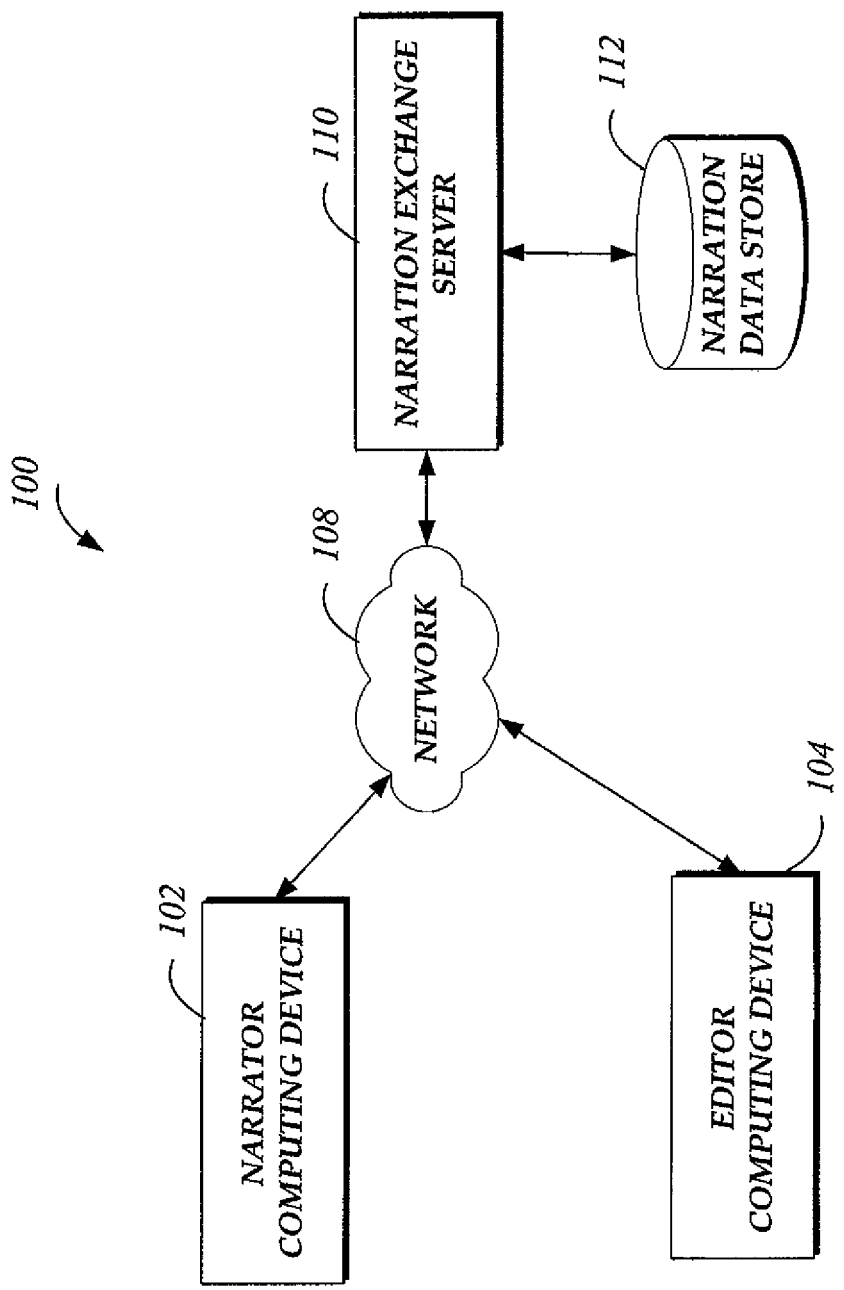
FIG. 1 is a block diagram depicting an illustrative operating environment in which a narrator and editor may cooperate to create or modify a narration audio file.

Generally described, aspects of the present disclosure relate to creating and modifying narration audio data. In some embodiments, a narration module as disclosed herein may be used to cause display of at least a portion of transcript text, where the transcript text includes words to be narrated by a user. The narration module may receive initial narration audio data corresponding to words of the displayed transcript text narrated by the user. In some embodiments, the narration module may align each word of the initial narration audio data with a corresponding word of the transcript text. The narration module may receive an indication of one or more words of the transcript text to be re-recorded, and may then receive replacement narration audio data corresponding to the one or more words of the transcript text to be re-recorded. The narration module may then incorporate the replacement narration audio data into the initial narration audio data based at least in part on the alignment of the one or more words in the initial narration audio data. Accordingly, in some embodiments, the narration module may enable the user to select an arbitrary portion of the displayed transcript text to re-record or re-narrate. For example, in some embodiments, the user may select any portion of the transcript text to re-record, regardless of the location of any breakpoints or other divisions in either the transcript or any previously recorded narration audio data.

The narration module as disclosed herein may allow an individual narrator to create and edit an audio version of a book or other written work. For example, a narrator may desire to create narration audio data corresponding to an article, book, or other written work. The narration module may display transcript text of the underlying written work to be narrated by the narrator. The narrator may then read at least a portion of the transcript text aloud, and the narration module may receive and store this initial narration audio data, which may be inputted via a microphone or other input device. In some embodiments, the narrator or other user may then select or indicate a portion of the transcript text to be re-recorded. The portion of the transcript text to be re-recorded may, in some embodiments, be arbitrarily selected to include as many or as few words as the narrator chooses. The narration module may then receive replacement narration audio data corresponding to the one or more words of the transcript text to be re-recorded, such as via a microphone by the narrator speaking the words aloud. The narration module may then incorporate the replacement narration audio data into the initial narration audio data. As used herein, "incorporating" replacement narration audio into initial or previously recorded narration audio generally corresponds to replacing the previously recorded word or words in the initial or previously recorded narration audio data corresponding to the selected portion of the transcript text to be re-recorded with the replacement narration audio data.

As used herein, a "narrator" generally refers to a user of a narrator computing device described below. According to some embodiments, the narrator may be any individual capable of speaking or reading aloud. For example, in some embodiments, the narrator may be a professional voice actor that wishes to produce a commercially sold audio book, or simply a novice computer user that wishes to record narration audio as a hobby or for private use, or an author looking to create an audio version of their book.

FIG. 1 depicts an illustrative operating environment 100 in which a narrator and editor may cooperate to create or modify a narration audio file. The depicted environment 100 includes a narrator computing device 102, an editor computing device 104, and a narration exchange server 110 communicatively connected by a network 108, such as the Internet. Those skilled in the art will recognize that the narrator computing device 102 and/or editor computing device 104 may collectively be any of a number of computing devices that are capable of communicating over a network including, but not limited to, a laptop, personal computer, tablet computer, electronic book reader, personal digital assistant (PDA), hybrid PDA/mobile phone, mobile phone, and the like. In some embodiments, one of the narrator computing device 102 and the editor computing device 104 may implement aspects of the present disclosure without cooperating with another computing device. In the illustrated embodiment, the narrator computing device 102 may present for display to a narrator a transcript of text to be narrated, and may receive and/or record audio data corresponding to the displayed transcript, such as from a microphone or other input device. The narrator computing device 102 is discussed in more detail below in reference to FIG. 2. In some embodiments, the narrator computing device 102 may be network-based. For example, the narrator computing device 102 may be located remotely from the narrator or other user and may be accessed by the narrator via a separate computing device (not shown) that communicates with the narrator computing device 102 via a communication network, such as communication network 108.

In the illustrated embodiment, the editor computing device 104 may present for display to a user one or more user interfaces for reviewing and/or providing feedback to the narrator regarding previously recorded narration audio, such as the illustrative user interface shown in FIG. 6, as will be further discussed below. A user of the editor computing device 104 may be, for example, the author of the underlying written work that has been narrated, a publisher, an editor, a producer, a focus group, etc. In other embodiments, the narrator may perform some or all of the review of previously recorded narration audio himself, such that the narrator effectively acts as both a narrator and editor. In some embodiments, the editor computing device 104 may include computer hardware and software components similar to those described below with respect to the narrator computing device 102.

In the environment shown in FIG. 1, the narrator computing device 102 and/or editor computing device 104 may communicate with the narration exchange server 110 via a communication network 108, such as the Internet or other communications link. Communications between the narrator computing device and/or editor computing device and the narration exchange server may be secure, such as by encrypting or encoding the data exchanged. The narration exchange server 110, in some embodiments, may enable authors or publishers to submit transcripts of books or other written works to be narrated by a narrator, as well as enable authors to review and provide feedback regarding previously recorded narration audio corresponding to their written work. The narration exchange server 110, in some embodiments, may also enable narrators to access or receive transcripts to be narrated, and to submit narration audio data corresponding to the transcripts. The transcripts and/or narration audio data may alternatively be provided to the narrator computing device and/or editor computing device via various types of computer readable media, such as Compact Disc ("CD") or Digital Video Disc ("DVD"). The narration exchange server 110 may further enable other users or consumers to access final versions of audio books or other narration audio created by the narrator.

Accordingly, the narrator computing device 102 and/or the editor computing device 104 may receive one or more transcripts from the narration exchange server 110 via network 108, or may send one or more transcripts to the narration exchange server 110 via network 108. Similarly, the narrator computing device 102 and/or the editor computing device 104 may also accordingly receive one or more narration audio files from the narration exchange server 110 via network 108, or may send one or more narration audio files to the narration exchange server 110 via network 108. In some embodiments, one or more users other than the narrator, such as a user who was not involved in the creation of narration audio data, may receive narration audio files, such as narration audio files created in part by the narrator computing device 102, from narration exchange server 110 using one or more additional computing devices (not illustrated). For example, the additional user may have purchased or otherwise been given access to a narration audio file available from the narration exchange server 110. In an alternative embodiment, narration audio data may be processed and/or modified without a narration exchange server 110. For example, in this embodiment, the narrator computing device 102 may communicate with the editor computing device 104 via network 108 to facilitate processing and/or modification of narration audio data.

As further illustrated in FIG. 1, the narration exchange server 110 includes or communicates with a narration data store 112. The narration data store 112 may include transcripts to be narrated. In some embodiments, the narration data store 112 may additionally include narration audio data and/or editor notes or other data associated with the narration audio and/or transcript. Those skilled in the art will appreciate that the narration data store 112 may be local to the narration exchange server 110, may be remote to the narration exchange server 110, and/or may be a network-based service itself. In other embodiments, the narration data store 112 may be local to the narrator computing device 102 or the editor computing device 104. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2:
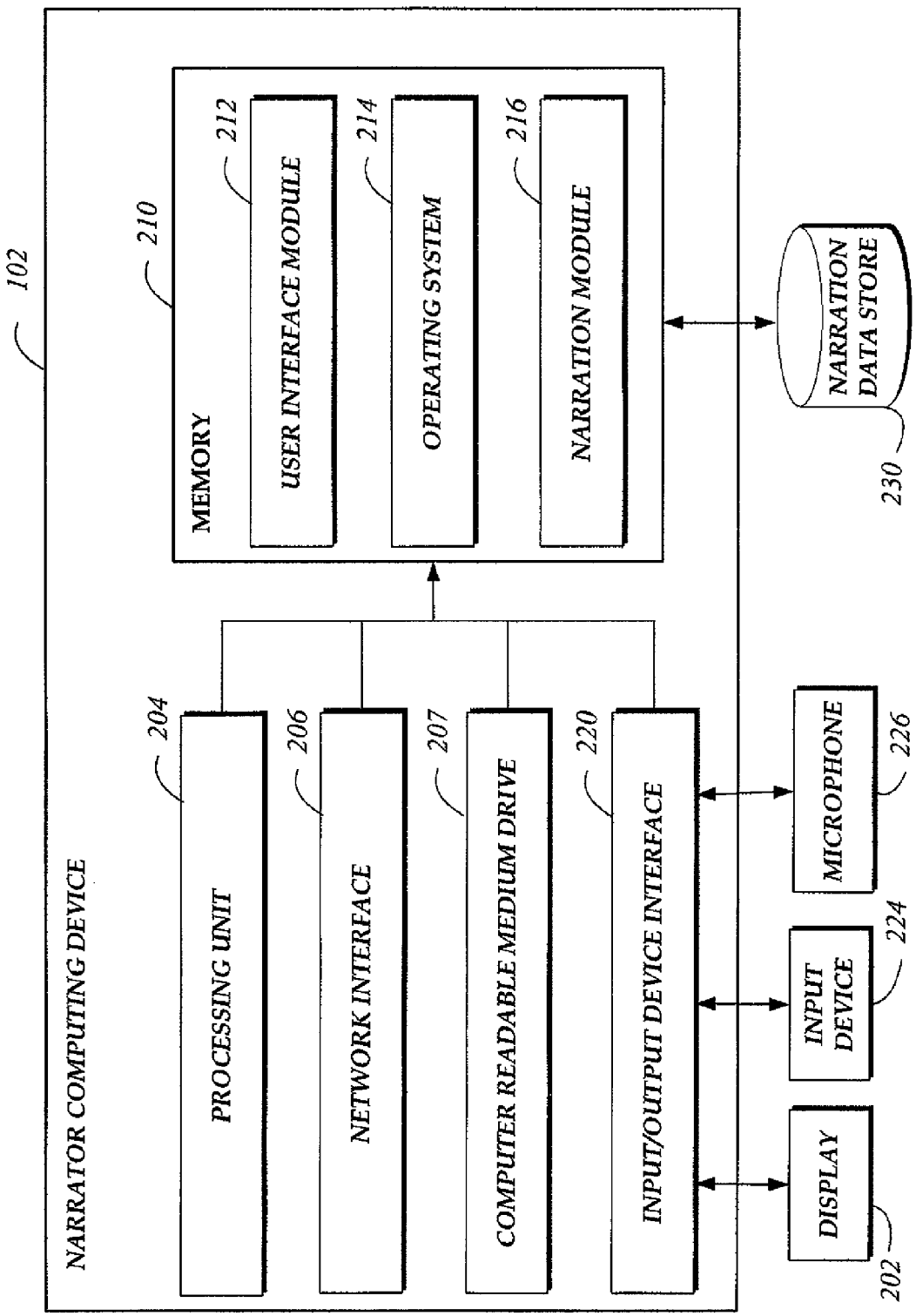
FIG. 2 depicts a general architecture of a narrator computing device for creating a narration audio file.

FIG. 2 depicts a general architecture of the narrator computing device 102 illustrated in FIG. 1. The one embodiment of narrator computing device 102 depicted in FIG. 2 includes an arrangement of computer hardware and software components that may be used to implement aspects of the present disclosure. Those skilled in the art will appreciate that the narrator computing device 102 may include many more (or fewer) components than those shown in FIG. 2. It is not necessary, however, that all of these generally conventional components be shown in order to provide an enabling disclosure. As illustrated in FIG. 2, the narrator computing device 102 includes a network interface 206, a processing unit 204, an input/output device interface 220, and a computer readable medium drive 207, all of which may communicate with one another by way of a communication bus. As illustrated, the narrator computing device 102 is optionally associated with, or in communication with, an optional display 202, an optional input device 224, and an optional microphone 226. In other embodiments, these components may be included in narrator computing device 102. The network interface 206 may provide the narrator computing device 102 with connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may accept input from the optional input device 224, such as a keyboard, mouse, digital pen, touch screen, or gestures recorded via motion capture. The input/output device interface 220 may also accept input of audio data from the optional microphone 226. The input/output device interface 220 may also output audio data to speakers or headphones (not shown).

The memory 210 contains computer program instructions that the processing unit 204 executes in order to implement one or more embodiments of the present disclosure. The memory 210 generally includes RAM, ROM and/or other persistent or non-transitory memory. The memory 210 may store an operating system 214 that provides computer program instructions for use by the processing unit 204 in the general administration and operation of the narrator computing device 102. The memory 210 may further include other information for implementing aspects of the present disclosure. For example, in one embodiment, the memory 210 includes a user interface module 212 that facilitates generation of user interfaces (such as by providing instructions therefor) for display upon a computing device. For example, a user interface may be displayed via a navigation interface such as a web browser installed on the computing device. In addition, memory 210 may include or communicate with an auxiliary narration data store 230. Data stored in the narration data store 230 may include transcripts and/or narration audio data, as discussed above.

In addition to the user interface module 212, the memory 210 may include a narration module 216 that may be executed by the processing unit 204. In one embodiment, the narration module 216 may be used to implement various aspects of the present disclosure, such as displaying a transcript of text to be narrated, receiving narration audio, receiving an indication of a portion of text to be re-narrated, etc., as described further below. In certain embodiments of the present disclosure, the editor computing device 104 and/or narration exchange server 110 may include several components that operate similarly to the components illustrated as part of the narrator computing device 102, including a user interface module, processing unit, computer readable medium drive, etc.

Figure 3:
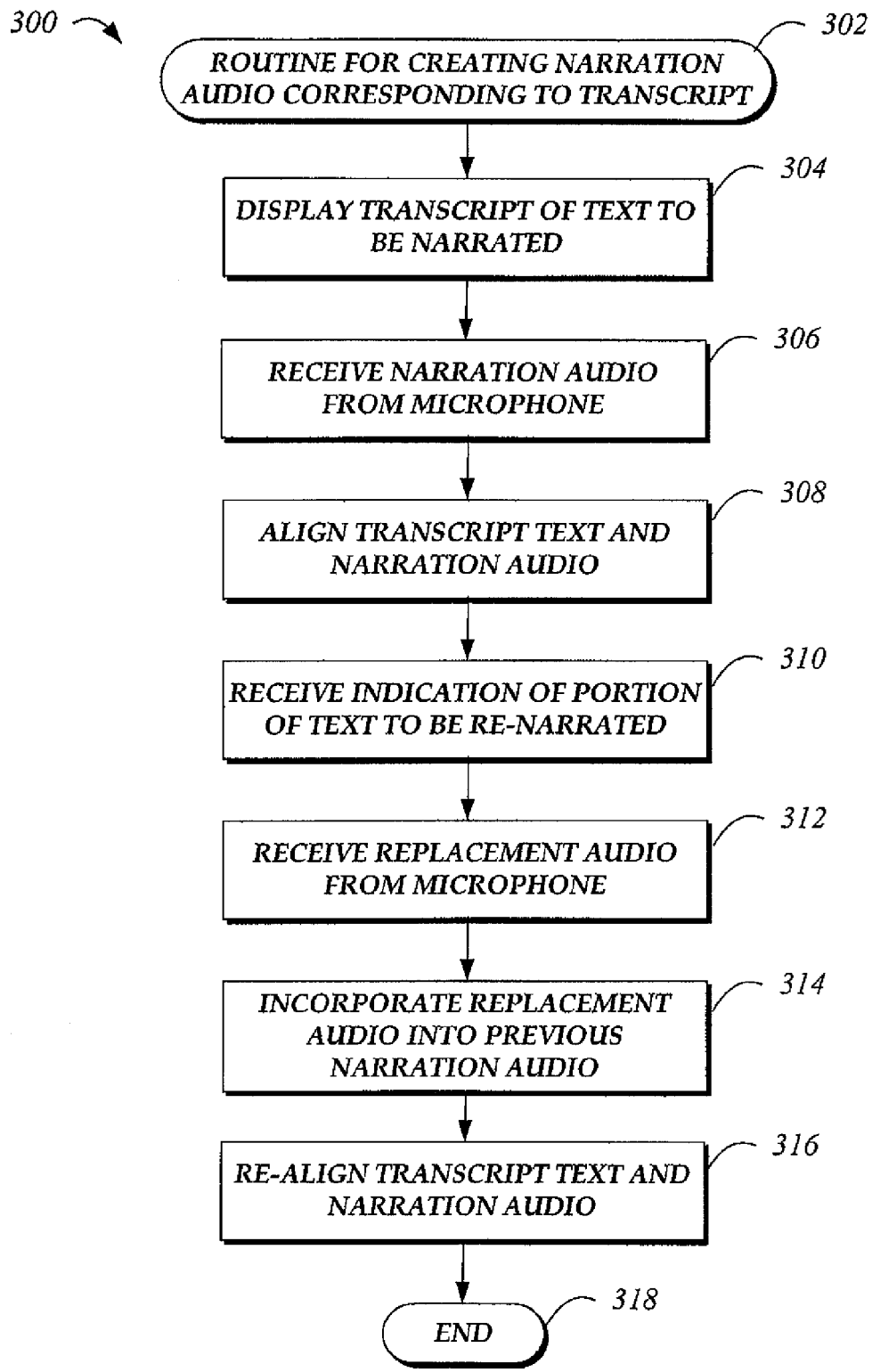
FIG. 3 is a flow diagram of an illustrative method implemented by a narrator computing device for creating narration audio corresponding to a transcript.

FIG. 3 is a flow diagram of an illustrative method 300 implemented by the narrator computing device 102 through execution of the narration module 216 to create narration audio corresponding to a transcript. The method begins at block 302 and then proceeds to block 304, in which the narrator computing device displays a portion of the transcript of text to be narrated by the narrator (e.g., the user of the narrator computing device 102). The transcript generally includes the text of the underlying written work that the narrator plans to narrate, such as text corresponding to the content of a book, article, etc. In some embodiments, the transcript may be retrieved from a data store, such as narration data store 230, which may be local to the narrator computing device 102 or remote to the narrator computing device 102. For example, in some embodiments, the narrator computing device 102 may receive the transcript from the narration exchange server 110. The received or retrieved transcript may be provided in various formats, and may include data other than the text of the underlying work itself. For example, the transcript may, in some embodiments, additionally include notes to the narrator, as discussed further below. Example user interfaces that display portions of a transcript are discussed below in reference to FIGS. 4-6.

At block 306, the narrator computing device 102 receives narration audio from a microphone, such as microphone 226, or another input device capable of recording sound or transforming sound into a form that may be electronically processed and/or stored. For example, the narrator may read words aloud from the portion of the transcript displayed at block 304 into the microphone or other input device. The narrator computing device 102 may receive the sound data from the microphone and store the data as narration audio data in one or more data stores. Those skilled in the art will appreciate that the audio data may be stored in one or more of a variety of formats with varying sample rates. For example, the audio data may be stored as a raw bitstream, or in a container format with a defined storage layer. The audio data may be stored uncompressed, or compressed to reduce the file size or storage size. It will be appreciated that one or more codecs or encoders corresponding to the appropriate audio file format may be used by the narrator computing device in storing the narration audio data. For example, the format of a narration audio data file may be, but is not limited to, WAV, AIFF, MPEG Layer-3 ("MP3"), AAC, OGG, FLAG, Windows Media Audio, etc. In some embodiments, the narration audio data may be stored in a proprietary file type that includes the transcript, notes regarding the transcript or narration audio, and/or metadata associated with the audio data. In some embodiments, the narration audio data, transcript data, and/or transcript notes may be stored in one or more files that include one or more forms of digital rights management ("DRM").

Once narration audio has been received, in some embodiments, the narrator computing device 102 may align the transcript text and the narration audio at block 308. For example, in some embodiments, the narrator computing device 102 may time stamp each word of the transcript text to indicate the start time and end time (or start time and length) of the corresponding spoken word in the narration audio data. In other embodiments, the narrator computing device 102 may determine byte locations in the stored audio data corresponding to the start and end of the audio data corresponding to each spoken word. In some embodiments, the alignment may occur at a less granular level than the word level, such as aligning by sentence or line of the transcript, or at a more granular level, such as aligning by syllable or phonetic sound (e.g., "phone"). The result of transcript alignment for a given portion of the transcript text and a corresponding portion of narration audio data may be that the text and narration audio data have effectively been synchronized. It may be further appreciated that the transcript alignment may occur in near real-time during the recording of the narration audio data. In other embodiments, the transcript alignment may occur after the narrator has indicated to the narrator computing device 102 that he has finished recording or paused recording of the narration audio data.

At block 310, the narrator computing device 102 may receive an indication of a portion of the transcript text to be re-narrated or re-recorded. The indication may be received from the narrator, for example, after the narrator has determined that he is unhappy with the quality, pronunciation, tone, etc., of a portion of previously recorded narration audio data. The indication may be received via one or more selectable controls presented for display in a user interface generated by the narrator computing device, such as the user interface described below in reference to FIG. 5. In some embodiments, the indication may be received after the narrator has listened to or played back the previously recorded narration audio data. In other embodiments, the narrator computing device may indicate to the narrator a portion of the transcript text to be re-narrated based on analysis of the audio quality or characteristics of the previously recorded narration audio, as discussed further below.

In further embodiments, the narrator computing device 102 may enable the narrator to select any arbitrary portion of the transcript text in order to indicate that the given portion will be re-narrated by the narrator. Thus, in some embodiments, the one or more words selected by the narrator to be re-narrated may be selected regardless of any breakpoints or predefined portion designations associated with the transcript text. For example, if the transcript text contains marks or breakpoints at certain predefined locations, such as at the end of a line, sentence, paragraph, chapter, etc., the narrator computing device 102 may nonetheless enable the narrator to select any word or set of words to be re-narrated. In some embodiments, the word or set of words to be re-narrated may cross multiple breakpoints, or be a set of words that form only a subset or portion of a predefined section in the transcript. Similarly, the one or more words to be re-narrated may be chosen regardless of the manner in which the narration audio data is stored. For example, in embodiments in which portions or sections of the narration audio data are stored separately or in different files, the word or set of words to be re-narrated may correspond to narration audio data that is stored in more than one file, or may correspond to only a portion of the narration audio data stored in a given file. While the above example refers to the narrator selecting a portion at the word level, in some embodiments, the narrator may select a portion to be re-narrated at another level of granularity, such as selecting a line, sentence or paragraph to be re-narrated.

At block 312, the narrator computing device 102 may receive replacement audio from the microphone 226 or other input device. The replacement audio may correspond to the one or more words of the transcript text that the narrator selected to re-narrate at block 310. The replacement audio may be the result of the narrator reading aloud the portion of the transcript that he has selected, and may be received in a manner similar to that described above in reference to receiving the initial narration audio at block 306. In some embodiments, the replacement narration audio may be stored in its own file, or otherwise stored in a manner such that it does not immediately overwrite any portion of the initial narration audio or other previously recorded narration audio. The replacement narration audio may be stored separately, in some embodiments, in order to maintain the previously recorded narration audio. The previously recorded narration audio may be maintained in storage, for example, in order to compare the previously recorded narration audio corresponding to the given portion to be replaced (and/or the audio before and after the portion to be replaced) with the replacement narration audio. In some embodiments, the initial narration audio may alternatively or additionally be maintained in storage so that the narrator may record multiple narration takes or attempts for a given portion of the transcript. The narrator and/or editor may then listen to the various recordings or takes in order to determine which recording is preferable.

At block 314, the narrator computing device 102 may incorporate the replacement narration audio received at block 312 into the initial or previously recorded narration audio. For example, the replacement narration audio may be incorporated into the initially recorded narration audio data if the narrator has not modified the initial recording. If instead the narrator has previously re-narrated portions of the initially recorded narration audio that have subsequently been incorporated into the initial narration audio, the replacement narration audio received at block 314 may be incorporated into this previous version of the narration audio that includes one or more previously re-narrated portions. In some embodiments, the replacement narration audio may be incorporated into the previous narration audio based on the alignment of the transcript text and the previously recorded narration audio, which was determined at block 308, so as to replace the portion of the previously recorded narration audio that the narrator has selected to re-narrate with the replacement narration audio data. For example, the narrator computing device may determine the start time (or starting byte) in the previously recorded narration audio data of the first word in the portion of text that the narrator has selected to re-narrate, as well as the end time (or ending byte) in the previously recorded narration audio data of the last word in the portion of text that the narrator has selected to re-narrate. The narrator computing device may then replace the portion of the previously recorded narration audio within this start time and end time range (or start byte and end byte range) with the replacement narration audio. If the replacement narration audio is longer or shorter than the portion of the previously recorded narration audio being replaced, the previously recorded narration audio after the end time stamp may be shifted to earlier or later in the audio data file than its previous time stamp, as appropriate, in order to accurately incorporate the replacement narration audio. In some embodiments, the narrator computing device may additionally equalize the replacement narration audio, or otherwise adjust its tone, volume, pace (such as the number of words per minute), or other audio qualities in order to match or blend with the surrounding audio in the previously recorded narration audio. The narrator computing device may flag or otherwise indicate to the narrator that the replacement narration audio does not match the audio qualities of the surrounding audio, with or without performing automatic adjustment or equalization of the replacement narration audio.

In some embodiments, the incorporation of the replacement narration audio at block 314 may occur once the narrator has finished narrating the replacement audio. In other embodiments, the narrator computing device 102 may not incorporate the replacement audio into the same audio data file as the previously recorded narration audio data until a later time, such as when the narrator finishes recording narration audio for the transcript or for a certain section of the transcript (such as a chapter of a book). In some such embodiments, the narrator computing device may nonetheless create the appearance to the narrator upon playing the narration audio that the replacement audio has been incorporated into the previously recorded audio, when in fact the previously recorded narration audio has not yet been modified. In order to accomplish this, the narrator computing device may store the start time and end time of the portion of the previously recorded narration audio to be replaced. When the narrator selects to play or listen to audio corresponding to a section of the audio data that includes the portion to be replaced, the narrator computing device may play the previously recorded narration audio data up until the replacement start time, then play the replacement audio, then play the previously recorded narration audio data after the replacement end time.

At block 316, after the narrator computing device 102 has incorporated the replacement audio into the previously recorded audio data, the narrator computing device may re-align the transcript text and the narration audio data. For example, re-alignment may be performed because the narration audio data that occurs after the portion of the audio data that has been replaced may be shifted from its previous time or byte location. Another reason that re-alignment may be performed is that the replacement narration audio itself may have not yet been aligned with the transcript prior to being incorporated into the previously recorded audio data. Once the replacement audio has been incorporated into the narration audio data, the re-alignment of the transcript text and the narration audio may be performed in a similar manner as described above with respect to the alignment of the transcript text and initial narration audio at block 308. The illustrated method ends at block 316.

Figure 4:
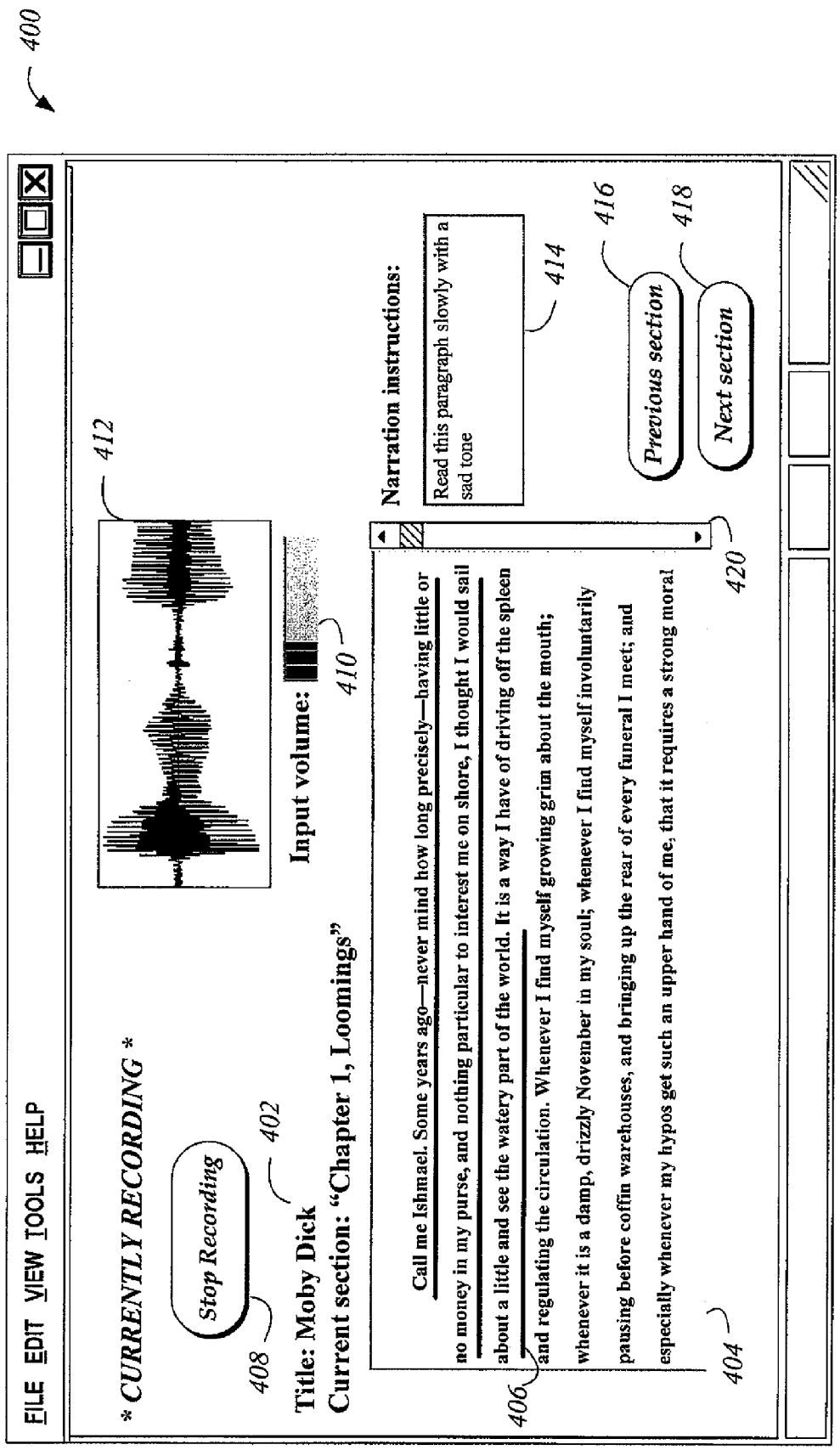
FIG. 4 is an illustrative user interface generated by the narrator computing device during narration audio recording.

FIG. 4 is an illustrative user interface 400 generated by the narrator computing device 102 during narration audio recording. User interface 400 includes transcript title information 402 that displays the title of the transcript, "Moby Dick," and the title of the current section, "Chapter 1, Loomings." As used herein, a section may correspond to a table of contents entry, bookmark, chapter, or other predetermined logical unit of the transcript text. User interface 400 also includes display of a portion of the transcript text 404, which the narrator may read aloud in order to provide narration audio data to the narrator computing device 102. The current progress of the narrator in reading the displayed transcript text 404 is displayed by progress bar 406. For example, the user interface 400 may be generated while the narrator is speaking aloud the transcript text 404 and has most recently spoken the sentence ending in "watery part of the world," as illustrated by the progress bar 406 stopping at the end of the word "world." In some embodiments, the progress bar 406 may progress along the transcript text 404 based on a predetermined pace or speed at which the narrator should narrate, which may be determined based on instructions included with the transcript text. In other embodiments, the pace of narration may be decided by the narrator, and the progress of the progress bar 406 may be based on near real-time analysis of the received narration audio in order to dynamically determine the last word spoken by the narrator. This determination may be made based on transcript alignment, as discussed above, or based on volume fluctuations of the received narration data (such as by assuming that quiet portions of the audio data correspond to pauses between words). In other embodiments, the narrator computing device 102 may not display a progress bar.

User interface 400 additionally includes a selectable control 408 that the narrator may select in order to indicate that the narrator computing device 102 should stop recording audio data. For example, user interface 400 may be presented while the narrator computing device 102 is receiving and/or recording narration audio data from an input device, such as microphone 226. The narrator may select control 408 in order to indicate that he wishes to stop or temporarily pause the recording of the narration audio data. In other embodiments, the narrator computing device may automatically stop or pause the recording of the narration audio data as a result of the narrator computing device detecting a lack of signal from the input device. User interface 400 also includes a sound waveform 412 that displays a graphical representation of the current audio input received via the microphone or other input device. Waveform 412 may display a graphical representation of the audio input over a certain predefined length of time, such as the last five seconds of audio data received. User interface 400 also includes an input volume meter 410, which may display the instantaneous volume level of audio data currently being received via the microphone or other input device.

User interface 400 further includes narration instructions 414, which state, "Read this paragraph slowly with a sad tone." In some embodiments, the narration instructions may be notes that are included with the transcript, such as notes provided by a publisher, editor or author associated with the transcript or underlying written work. User interface 400 also includes navigation controls, including a scroll bar 420, a previous section control 416 and a next section control 418. The scroll bar 420 may be selected by the narrator in order to scroll to other portions of the current section of the transcript text, in this case "Chapter 1, Loomings." Previous section control 416 and next section control 418 may be selected by the narrator in order to display transcript text from the previous or next section of the transcript respectively (in this case, the previous or next chapter of "Moby Dick").

Figure 5:
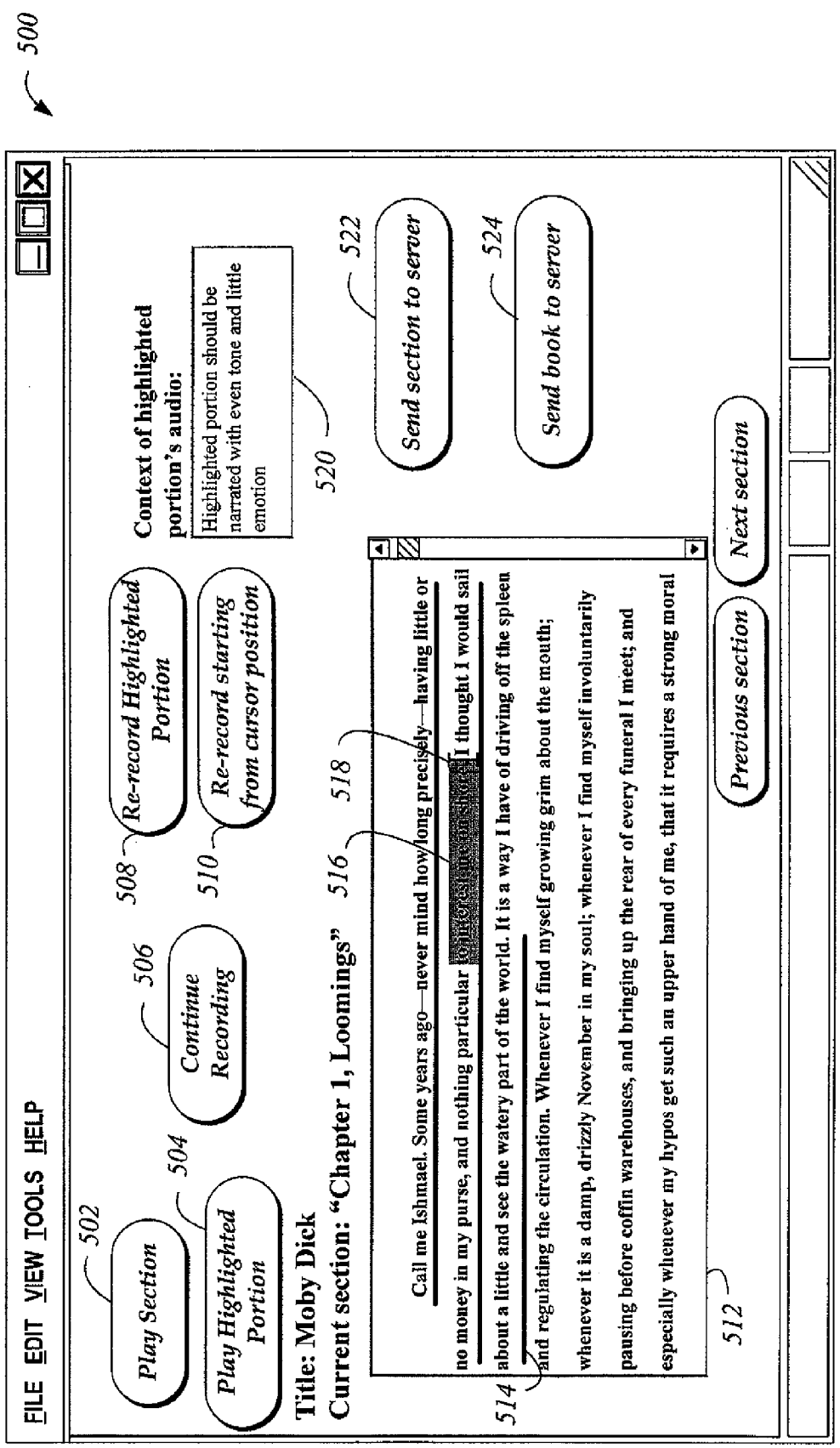
FIG. 5 is an illustrative user interface generated by the narrator computing device for selecting portions of a narration transcript to be re-recorded.

FIG. 5 is an illustrative user interface 500 generated by the narrator computing device 102 that enables the narrator to select portions of a transcript to be re-recorded. User interface 500 may be generated, for example, after the narrator has narrated the transcript, a section of the transcript, or a portion of a section of the transcript, and the narrator computing device has stored corresponding narration audio data. User interface 500 includes a control 502, which the narrator may select to play the recorded audio corresponding to the current section (in this case "Chapter 1, Loomings"), and a control 504, which the narrator may select to play the recorded audio corresponding to a highlighted portion 516 of transcript text 512 (in this case, the words "to interest me on the shore"). For example, selection of controls 502 or 504 may cause the narrator computing device 102 to output the corresponding audio data to speakers, headphones, or another output device via input/output device interface 220. As illustrated, the highlighted portion 516 may be selected by the narrator using a cursor 518. As mentioned above, in some embodiments, the narrator may select or highlight any arbitrary portion of the displayed transcript text 512 to be played or re-narrated. The narrator computing device 102 may determine the appropriate portion of the narration audio data to play when the narrator selects control 504 based at least in part on the transcript alignment of the selected words of the transcript and the narration audio data, as discussed above in reference to FIG. 3.

User interface 500 additionally includes a control 506, which the narrator may select in order to indicate that the narrator wishes to continue narrating from the previous end of the narration audio data, which may be the point at which the narrator previously selected to stop or pause recording. In the illustrated example, the next portion of the transcript text that has not been narrated, based on the location of the progress bar 514, is the sentence beginning "It is a way I have." User interface 500 further includes a control 508, which the user may select in order to re-record or re-narrate highlighted portion 516. Re-narration of previously recorded narration audio data, including incorporating the replacement audio data into the previously recorded narration audio data, is discussed in more detail above in reference to FIG. 3. User interface 500 additionally includes a control 510, which the narrator may select in order to re-record or re-narrate the remainder of the section beginning at the position of the cursor 518. In some embodiments, the narrator may place the cursor 518 in any arbitrary location in the transcript text (including mid-sentence, as shown) and select to re-narrate the transcript text going forward from that location.

User interface 500 also includes context notes 520, which instruct the narrator regarding the context of the highlighted portion 516 relative to the recorded audio corresponding to the surrounding text in transcript text 512. For example, in some embodiments, the narrator computing device 102 may analyze audio characteristics of the audio data corresponding to one or more words or sentences surrounding the highlighted portion 516 in order to determine how the narrator should read or narrate the highlighted portion so that it matches the sound of the previously recorded narration audio. In some embodiments, the audio characteristics analyzed may include dynamic range of volume, tone, stress, speed, emotion, etc.

User interface 500 further includes a "send section to server" control 522 and a "send book to server" control 524. "Send section to server" control 522 may be selected by the narrator in order to indicate that the narrator computing device 102 should send the narration audio data corresponding to the current section (in this case, "Chapter 1, Loomings") to the narration exchange server 110. Similarly, "send book to server" control 524 may be selected by the narrator in order to indicate that the narrator computing device 102 should send the narration audio data corresponding to the entire transcript (in this case, the book "Moby Dick") to the narration exchange server 110. The narration audio data may be sent to the narration exchange server, in some embodiments, once the narrator has finished narrating a given section or book and wishes to either enable an editor to review the narration audio data, or for other users to be able to access or purchase the recorded narration audio data. For example, in some embodiments, once the section or book is sent to the narration exchange server, the narration exchange server may make the narration audio data file(s) accessible to other users, such as consumers of audio books, or a single section of the audio book may be shared for promotional purposes via a network 108.

Figure 6:
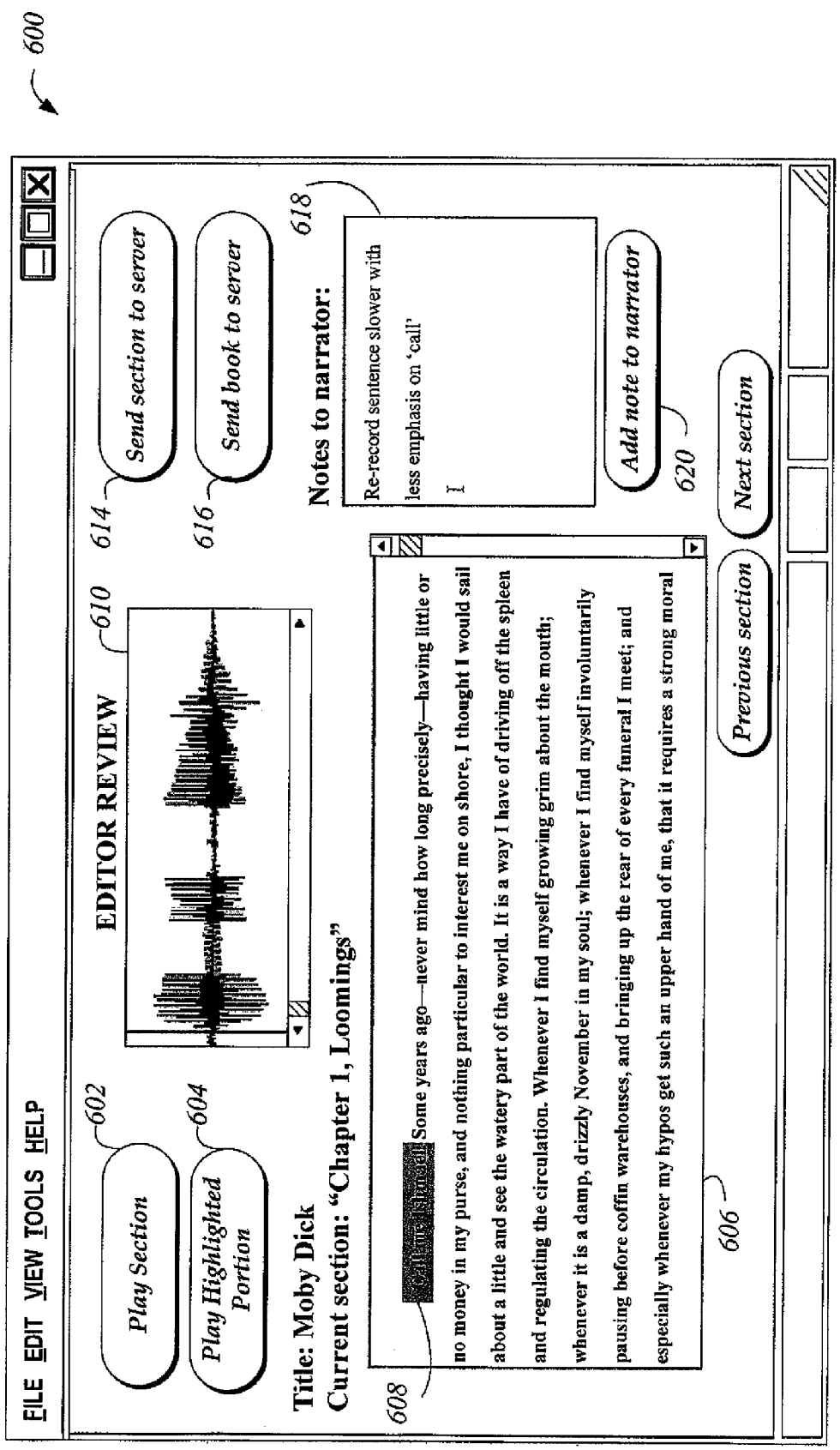
FIG. 6 is an illustrative user interface generated by an editor computing device for providing feedback regarding recorded narration audio.

FIG. 6 is an illustrative user interface 600 generated by the editor computing device 104 that enables an editor to provide feedback to a narrator regarding previously recorded narration audio corresponding to transcript text 606. While the user of the editor computing device is often referred to herein as the editor, a user of the editor computing device 104 may be the author of the underlying written work that has been narrated, a publisher, a producer, a focus group, etc., as discussed above. User interface 600 may be generated, for example, after the narrator has recorded narration audio data using narrator computing device 102. The editor computing device may have then received the narration audio data and corresponding transcript from the narrator computing device 102 or the narration exchange server 110.

User interface 600 includes a play section control 602, which may be selected by the editor in order to indicate that the editor computing device 104 should play the audio data corresponding to the current section (in this case, "Chapter 1, Loomings"), such as by outputting the corresponding audio data to speakers, headphones, or another output device. User interface 600 also includes a play highlighted portion control 604, which may be selected by the editor in order to indicate that the editor computing device should play the audio data corresponding to the highlighted portion 608. User interface 600 additionally includes a waveform 610, which displays a graphical representation of the current section of the narration audio data corresponding to transcript text 606. The user interface 600 enables the editor to type notes to the narrator in a notes field 618, which as illustrated reads "Re-record sentence slower with less emphasis on 'call.'" In some embodiments, the editor may type notes to be associated with a given section or a specific portion, such as may be indicated by the editor's selection or highlighting of one or more words of transcript text 606. Once the editor has typed notes to the narrator, the editor may indicate that the note should be included in the narration file data or transcript data by selecting a control 620. Once the editor has completed review of a section, the editor may select a control 614 to indicate that the editor computing device 104 should send the current section (which may include transcript text, narration audio data and notes to the narrator) to the narration exchange server 110, where it may be accessed by narrator computing device 102. Once the editor has completed review of the entire transcript, the editor may select a control 616 to indicate that the editor computing device 104 should send the entire book to the narration exchange server 110. In other embodiments, the editor computing device 102 may send the section or book to the narrator computing device 102 rather than the narration exchange server 110.

The alignment of narration audio data with transcript text described herein may have a variety of uses or applications that have not been discussed above. In some embodiments, many word processing features typically available for editing text may be extended to allow editing of audio data corresponding to transcript text. For example, a "find and replace" control may be presented in one or more user interfaces that enables a user to indicate that the narrator computing device 102 should find all instances of a certain word or set of words in the transcript, and replace the narration audio data corresponding to each occurrence or instance of the given word or set of words with replacement narration audio data. Such a feature may be used, for example, by a narrator who realizes after narrating a lengthy transcript that he has repeatedly mispronounced a word in the transcript, such as a character's name in a novel. As another example, if an unabridged version of a book has been narrated, an abridged version may be created by removing sentences, paragraphs or sections in the transcript text, and the corresponding narration audio data may then be automatically deleted based on the alignment information. Similarly, if an abridged version of the text already exists, the abridged and unabridged version may be compared to find the differences in the text, and the narrator may be prompted to record only the portions of transcript text that have not already been recorded during narration of the unabridged version.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A system for processing narration audio data, the system comprising:
 a data store that stores transcript text comprising words to be narrated by a user; and
 a computing device in communication with the data store and that is operative to:
  cause display of at least a portion of the transcript text;

receive initial narration audio data corresponding to words of the displayed transcript text narrated by the user;

store the received initial narration audio data in an audio data file;

align each word of the initial narration audio data with a corresponding word of the transcript text;

receive an indication of one or more words of the transcript text to be re-recorded based at least in part on a selection by the user of the one or more words within a displayed portion of the transcript text, wherein the one or more words have been arbitrarily selected by the user regardless of breakpoints in the transcript text;

receive replacement narration audio data corresponding to the one or more words of the transcript text to be re-recorded; and incorporate the replacement narration audio data into the audio data file based at least in part on the alignment of the one or more words in the initial narration audio data, such that the audio data file comprises (a) at least a portion of the initial narration audio data before the one or more words, (b) the replacement narration audio data corresponding to the one or more words, and (c) at least a portion of the initial narration audio data after the one or more words.

2. The system of claim 1, wherein the transcript text corresponds to the text of a book.

3. The system of claim 1, wherein the replacement narration audio data is received from a microphone.

4. The system of claim 1, wherein the computing device is further operative to re-align one or more words of the initial narration audio data with the corresponding word of the transcript text after incorporating the replacement narration audio data into the initial narration audio data.

5. The system of claim 1, wherein incorporating the replacement narration audio data into the initial narration audio data comprises replacing a portion of the initial narration audio data corresponding to the one or more words of the transcript text to be re-recorded with the replacement narration audio data.

6. The system of claim 1, wherein said indication comprises a single word.

7. The system of claim 6, wherein incorporating the replacement narration audio data comprises incorporating the single word replacement narration audio data into the initial narration audio data replacing each instance of previously recorded audio data corresponding to the single word in the initial narration audio data.

8. The system of claim 6, wherein the computing device is further operative to:

receive a second indication to incorporate the replacement narration audio data into the initial narration audio data at each instance corresponding to said single word.

9. The system of claim 8, wherein incorporating the replacement narration audio data comprises incorporating the single word replacement narration audio data into the initial narration audio data replacing each instance of previously recorded audio data corresponding to the single word in the initial narration audio data.

10. A computer-implemented method for processing narration audio data, the computer-implemented method comprising:

as implemented by one or more computing devices configured with specific executable instructions, causing display of at least a portion of transcript text comprising words to be narrated by a user;

receiving initial narration audio data comprising words of the displayed transcript text narrated by the user;

storing the received initial narration audio data in an audio data file;

aligning each word of the initial narration audio data with the corresponding word of the transcript text;

receiving an indication of a portion of the transcript text to be re-recorded based at least in part on a selection by the user of one or more words within a displayed portion of the transcript text, wherein the selected one or more words indicate the portion of the transcript text to be re-recorded;

receiving replacement narration audio data corresponding to the portion of the transcript text to be re-recorded; and incorporating the replacement narration audio data into the audio data file, such that the audio data file comprises (a) at least a portion of the initial narration audio data before the one or more words, (b) the replacement narration audio data corresponding to the one or more words, and (c) at least a portion of the initial narration audio data after the one or more words.

11. The computer-implemented method of claim 10, wherein aligning each word of the initial narration audio data with the corresponding word of the transcript text comprises determining a start time in the initial narration audio data of the corresponding word of the transcript text.

12. The computer-implemented method of claim 10, wherein aligning each word of the initial narration audio data with the corresponding word of the transcript text comprises determining a starting byte in the initial narration audio data of the corresponding word of the transcript text.

13. The computer-implemented method of claim 10, further comprising re-aligning one or more words of the initial narration audio data with the corresponding word of the transcript text after incorporating the replacement narration audio data into the initial narration audio data.

14. The computer-implemented method of claim 10, wherein incorporating the replacement narration audio data into the initial narration audio data comprises replacing a portion of the initial narration audio data corresponding to the one or more words of the transcript text to be re-recorded with the replacement narration audio data.

15. The computer-implemented method of claim 10, wherein said indication comprises a single word.

16. The computer-implemented method of claim 10, wherein incorporating the replacement narration audio data comprises incorporating the replacement narration audio data into the initial narration audio data replacing each instance of previously recorded audio data corresponding to the one or more words selected to be re-recorded.

17. The computer-implemented method of claim 15, further comprising:

receiving a second indication to incorporate the replacement narration audio data into the initial narration audio data at each instance corresponding to said single word.

18. The computer-implemented method of claim 17, wherein incorporating the replacement narration audio data comprises incorporating the single word replacement narration audio data into the initial narration audio data replacing each instance of previously recorded audio data corresponding to the single word in the initial narration audio data.

19. A computer-implemented method for modifying current narration audio data created by recording words narrated from a transcript text, the computer-implemented method comprising:

as implemented by one or more computing devices configured with specific executable instructions, retrieving an audio data file comprising the current narration audio data;

generating a notification to a user indicating a portion of the transcript text to be re-recorded, said portion comprising one or more words of the transcript text;

receiving replacement narration audio data created by the user, the replacement narration audio data corresponding to the portion of the transcript text to be re-recorded and comprising the one or more words of the portion as narrated by the user; and based at least in part on alignment of the one or more words of the transcript text with corresponding audio data of the audio data file, replacing one or more words of the current narration audio data within the audio data file with the one or more words of the replacement narration audio data, such that the audio data file comprises (a) at least a portion of the current narration audio data before the one or more words, (b) the replacement narration audio data corresponding to the one or more words, and (c) at least a portion of the current narration audio data after the one or more words.

20. The computer-implemented method of claim 19, further comprising generating for display one or more notes regarding the current narration audio data, wherein the one or more notes have been provided by an editor.

21. The computer-implemented method of claim 19, wherein the portion of the transcript text to be re-recorded is determined based on feedback received from an editor.

22. The computer-implemented method of claim 19, wherein the portion of the transcript text to be re-recorded is automatically determined based at least in part on one or more audio characteristics of the current narration audio data.

23. The computer-implemented method of claim 19, wherein the replacement narration audio data corresponds to a single word.

24. The computer-implemented method of claim 23, wherein said replacing one or more words of the current narration audio data comprises automatically replacing each instance in the current narration audio data corresponding to said single word with the replacement narration audio data.

25. The computer-implemented method of claim 19, wherein said replacing one or more words of the current narration audio data comprises automatically replacing each instance in the current narration audio data corresponding to the one or more words with the replacement narration audio data.

26. A non-transitory computer-readable medium having a computer-executable component for enabling a user to modify current narration audio data created by recording words narrated from a transcript text, the computer-executable component comprising:

a user interface component for:

causing display of a user interface that includes at least a portion of the transcript text, wherein the user interface comprises one or more controls that enable the user to arbitrarily select one or more words of the displayed portion of the transcript text to indicate that the selected one or more words will be re-recorded; and an audio replacement component for:

receiving replacement narration audio data corresponding to the selected one or more words to be re-recorded; and replacing, within an audio data file, one or more words of the current narration audio data corresponding to the one or more words to be re-recorded with the replacement narration audio data, such that the audio data file comprises (a) at least a portion of the current narration audio data before the one or more words, (b) the replacement narration audio data corresponding to the one or more words, and (c) at least a portion of the current narration audio data after the one or more words.

27. The non-transitory computer-readable medium of claim 26, wherein the replacement narration audio data comprises audio data of words spoken by the user.

28. The non-transitory computer-readable medium of claim 26, wherein the user interface further comprises one or more controls that enable the user to arbitrarily select a location in the displayed portion of the transcript text in order to re-record narration audio beginning at the selected location.

29. The non-transitory computer-readable medium of claim 26, wherein the one or more words of the current narration audio data corresponding to the one or more words to be re-recorded are replaced with replacement narration audio data based at least in part on alignment data associated with the transcript text and the current narration audio data.

30. The non-transitory computer-readable medium of claim 26, wherein the user interface further comprises a control that enables the user to select replacement of all instances of the selected one or more words with the replacement narration audio data.

* * * * *